United States Patent [19]

Freiter

[11] 4,176,846

[45] Dec. 4, 1979

[54] ACTUATING MECHANISM FOR A RECORD CHANGER WITH A STACKING SPINDLE

[75] Inventor: Gerhard Freiter, Berlin, Fed. Rep. of Germany

[73] Assignee: U.S. Philips Corporation, New York, N.Y.

[21] Appl. No.: 907,303

[22] Filed: May 18, 1978

[30] Foreign Application Priority Data

May 21, 1977 [DE] Fed. Rep. of Germany ....... 2723077

[51] Int. Cl.² ...................... G11B 17/04; G11B 17/12
[52] U.S. Cl. .................................................. 274/10 S
[58] Field of Search ............................ 274/10 S, 10 R

[56] References Cited

U.S. PATENT DOCUMENTS

| | | |
|---|---|---|
| 3,081,093 | 3/1963 | Tiedtke ............................. 274/10 S |
| 3,762,722 | 10/1973 | Tajime ............................. 274/10 S |
| 3,797,834 | 3/1974 | Takahashi et al. ................ 274/10 S |

Primary Examiner—Harry N. Haroian
Attorney, Agent, or Firm—David R. Treacy

[57] ABSTRACT

An actuating lever mechanism for a record changer having a stacking spindle actuated by a rod. A pulling lever free end is moved up or down by scanning control tracks on a command disc, separate tracks and linking means moving the lever up and down. To provide shut-off functions when the stacking spindle is removed for single play operation, the free end has a pivoted bracket which locks over a chassis stop in the absence of a spindle, and the linking means for one track is resiliently arranged.

8 Claims, 7 Drawing Figures

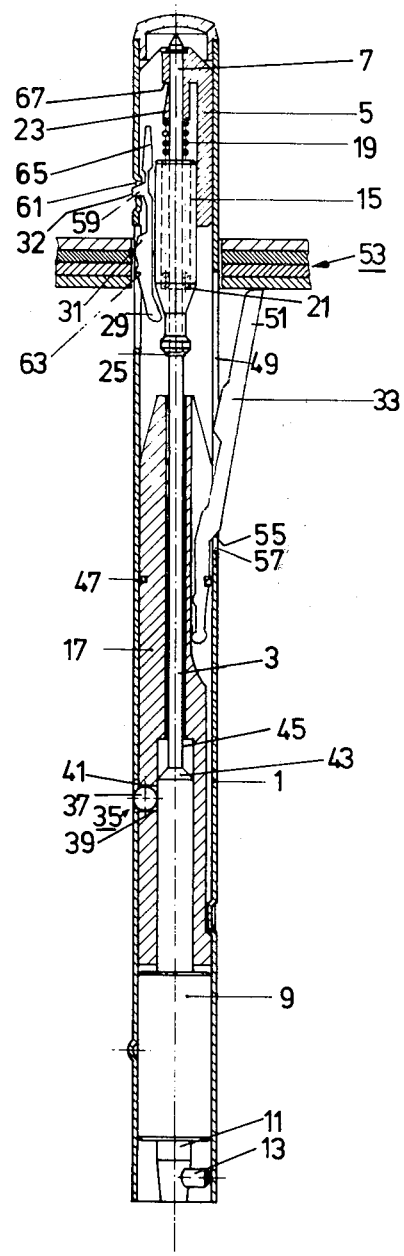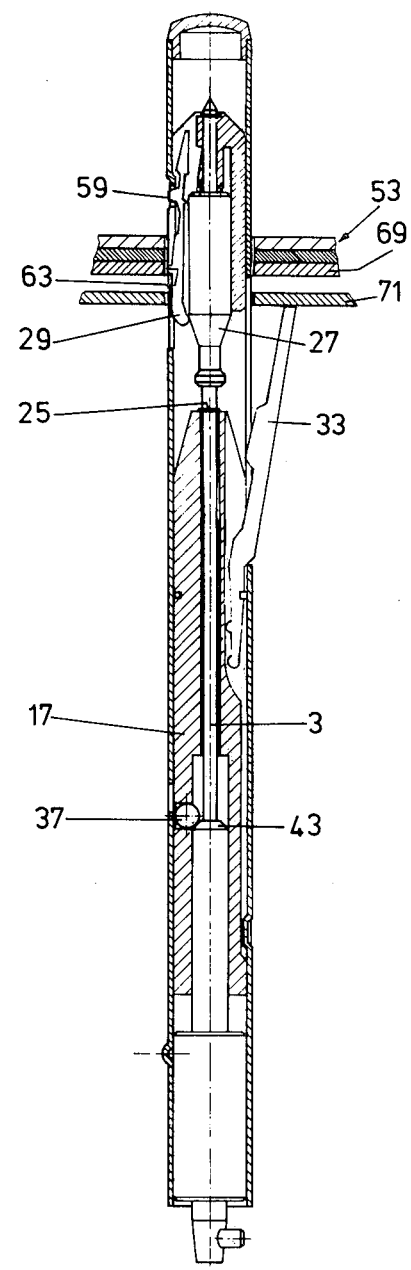

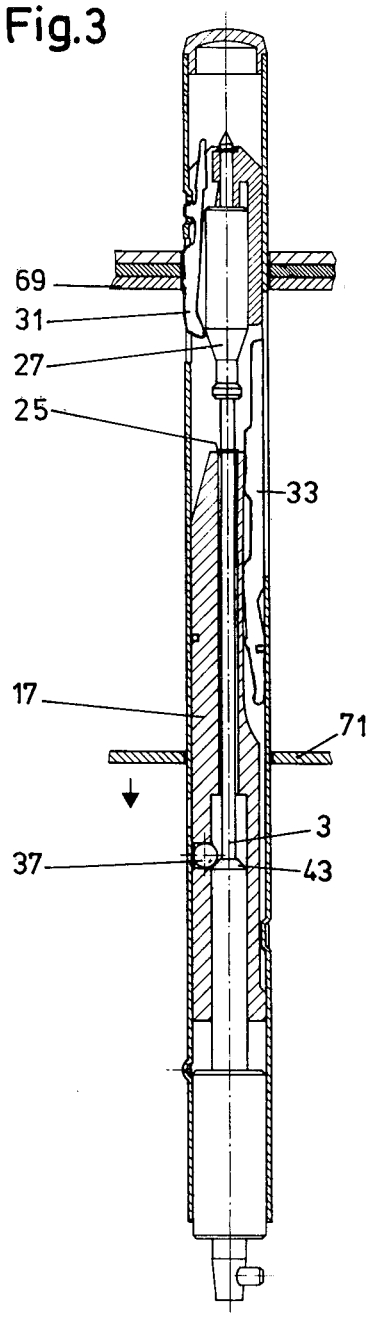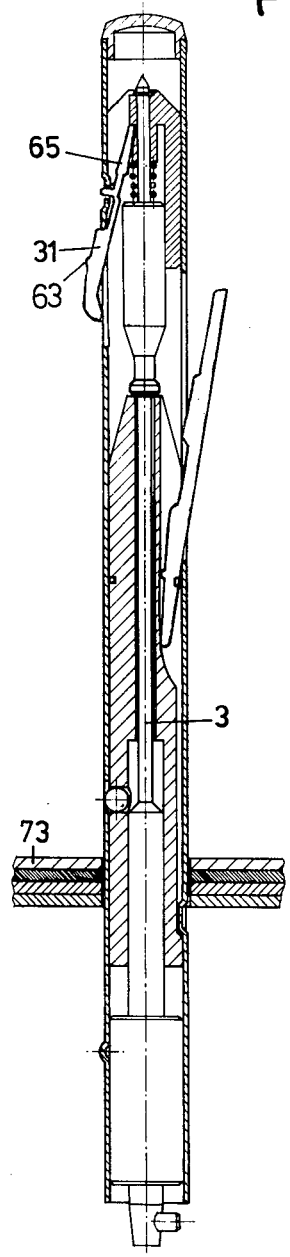

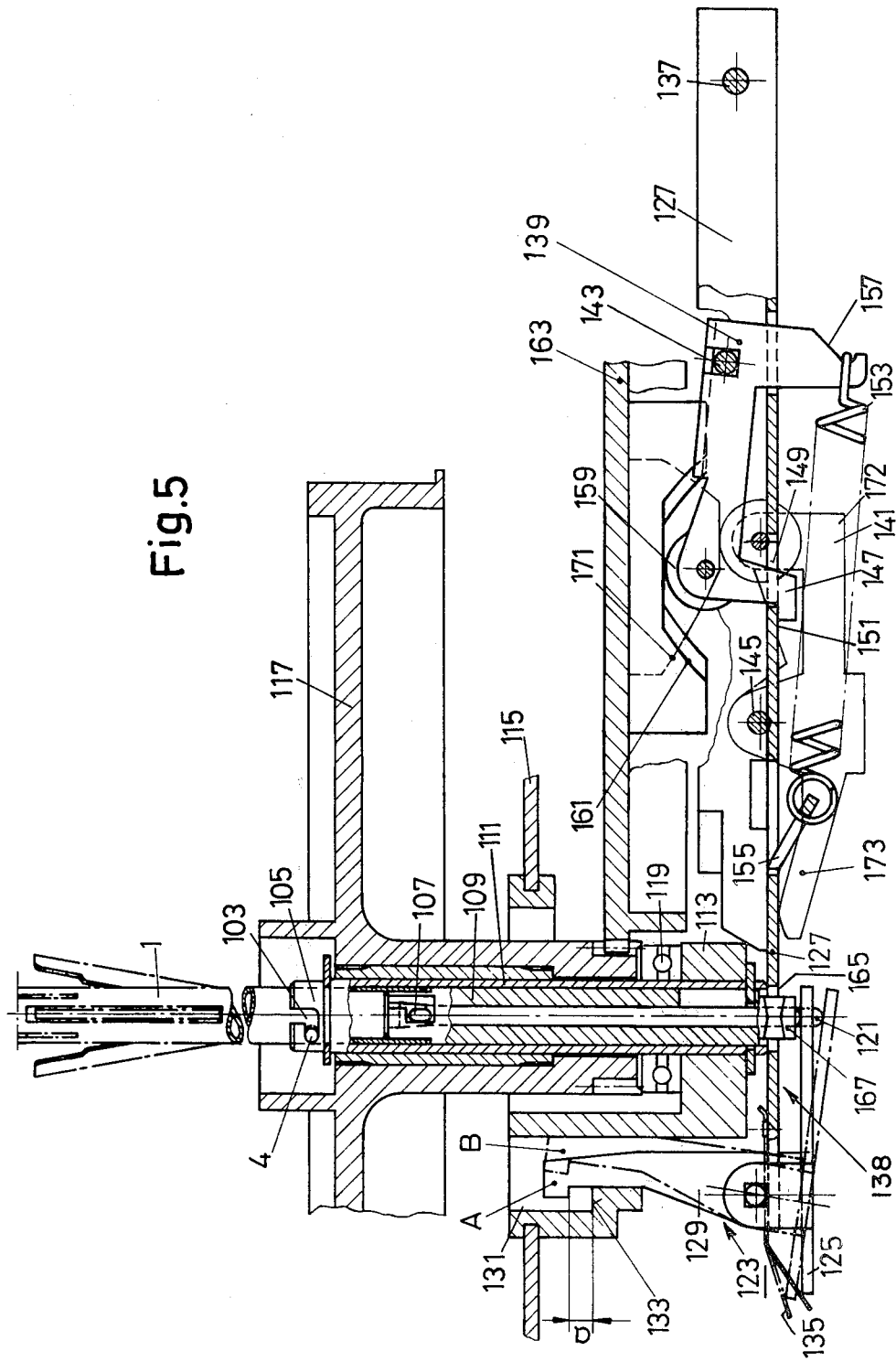

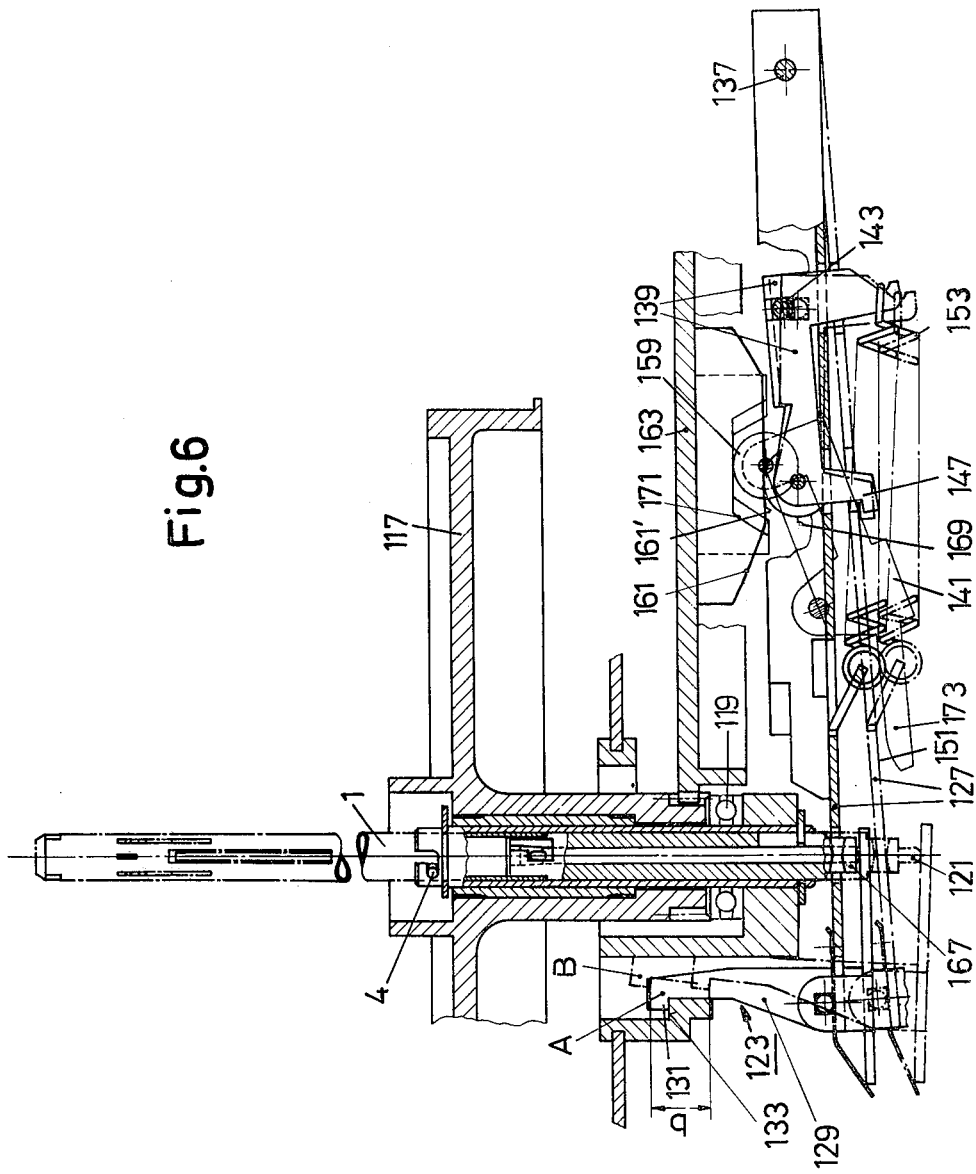

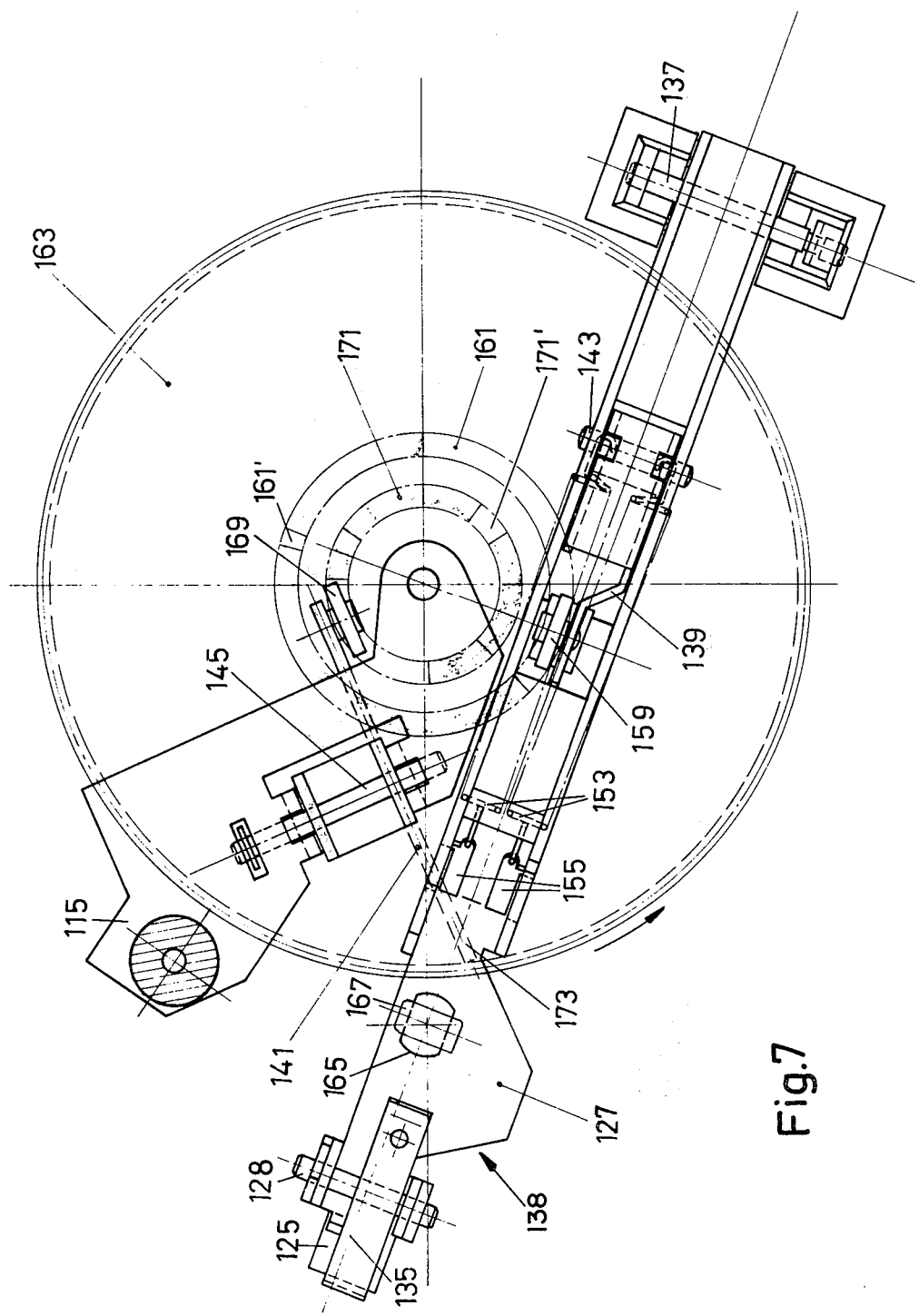

ACTUATING MECHANISM FOR A RECORD CHANGER WITH A STACKING SPINDLE

BACKGROUND OF THE INVENTION

The invention relates to a an actuating mechanism for a phonograph record changing apparatus (hereinafter referred to as a record changer) for actuating an actuating rod which is disposed in the lower part of an umbrella-type stacking spindle; and more particularly to a record changer whose changing mechanism, which comprises a command means, moves the rod by pivot a lever.

Such devices are known, because it is always necessary to transmit the commands in some way from underneath the phonograph deck to a stacking spindle using a lever or the like. When a stacking spindle, as is for example known from German patent specification 11 28 166, to which U.S. Pat. No. 3,081,093 corresponds, is loaded by spring tension, it is necessary to subject the actuating rod of the stacking spindle to substantial tensile forces. This demands a powerful driving mechanism.

SUMMARY OF THE INVENTION

It is an object of the invention to provide an actuating mechanism for a stacking spindle, which enables an easy movement of a spindle actuating rod in both directions. At the same time a stop command is to be derived through the lever which operates the actuating rod.

In a record changer according to the invention a pulling lever, which is journalled on one side, in a non positive and articulated manner engages the actuating rod or an axial extension thereof, and the free lever end which engages the actuating rod or the extension is pivotable upwards and downwards under control of separate height-control tracks on the command means which are being scanned.

By scanning the height-control tracks such a device enables the actuating rod to be pulled upwards and downwards without additional force producing means by a simple follower process. Such a device is simple and extremely reliable.

The device in accordance with the invention may in particular be constructed so that the height-control track for the pull-out movement of the pulling lever is scanned by a pull-out part such as a roller which is journalled on the pulling lever, which roller imparts the pull-out movement to the pulling lever, and that the height-control track for the retracting movement is scanned by means such as a push lever which is journalled on the chassis, which lever when the height-control track for the upward movement rises, urges the pulling lever upwards, the separate height-control tracks comprising oppositely-directed ascending and descending surfaces. The device complies with all the requirements, as long as no additional stop signal is derived through the pulling lever. If this is required, the command should be derived by a specific pulling-lever position.

A stacking spindle with a single actuating rod, as described herein, provides a stop command in that the pull-out movement of the actuating rod is shortened. This reduction of the pull-out path results in a reduction of the pivoting path of the pulling lever; that is, the travel of the pulling lever is shortened by blocking.

In order to avoid damage to the device when the pull-out path of the pulling lever is shortened, the pull-out roller, in accordance with a further embodiment of the invention, is journalled on the pulling lever, by an overload protection which allows movement of the pull-out part or roller although full movement of the pulling lever is not possible. In a preferred embodiment of the invention this overload protection may be constructed so that the pull-out roller is journalled on a roller lever which in its turn is journalled on the pulling lever, the roller lever being resiliently coupled with the pulling lever in such a way that the roller lever only pivots relative to the pulling lever when the pull-out roller moves up a hill of the control track, but the pulling lever cannot follow the roller movement because it is blocked. Coupling the roller lever to the pulling lever can then be achieved in that the roller lever, which is pivotable about an axis parallel to pivoting of the pulling lever is provided with a coupling hook, which by means of the tensile force of a tension spring engages with the pulling lever in the scanning direction of the pull-out roller.

It is common practice that record changers are also used as record players. In that case no stacking spindle is fitted in the turntable. If no stacking spindle is fitted, blocking of the full pull-out path, which provides the stop command, is not possible with the device described above. In accordance with a further embodiment of the invention this blocking facility is obtained in that a locking bracket, which limits the pull-out path of the pulling lever, is journalled on the pulling lever, which bracket in order to limit the pull-out path is pivoted so that a portion of the bracket engages a stop edge of the chassis. Preferably, a push rod is guided in the chassis, which bears against the locking bracket when the stacking spindle is fitted and pivots the bracket so that a hook portion can move past the stop edge, and the pulling lever can consequently cover the full pull-out path. Thus, when the stacking spindle is not fitted the stop command for the record changer is provided by the locking bracket.

The invention will be described in more detail with reference to the drawing which shows an embodiment, the functions of the stacking spindle and the actuating device for the stacking spindle being jointly described because of the coordination of the movements.

BRIEF DESCRIPTION OF THE DRAWING

FIG. 1 is a sectional elevation of a the stacking spindle used with the invention in the initial position, FIG. 2 is a similar view of the stacking spindle of FIG. 1 during separation of the lowermost record, FIG. 3 shows the stacking spindle when the lowermost gramophone record is dropping, FIG. 4 shows the stacking spindle in the functional position for end stop, FIG. 5 is a partial cross-section through a changing mechanism in accordance with the invention, with the stacking spindle in the initial position, FIG. 6 shows the embodiment of FIG. 5 in the changing position with retracted supporting levers, and FIG. 7 is a plan view of the lever mechanism of FIGS. 5 and 6 in combination with a partial plan view of the command disc.

DESCRIPTION OF THE PREFERRED EMBODIMENT

The stacking spindle comprises an outer tube 1 in which an actuating rod 3 is axially movable. The actuating rod 3 is journalled and guided by a profiled member 5 which is secured to the upper end 7 of the actuating rod 3, and a pressure member 9, which is rigidly connected to and guides the lower end of the actuating rod 3. Below the member 9 the lower end 11 of the actuating rod has a laterally projecting pin 13 with which the changing mechanism engages, as is described below.

A clamping sleeve 15 and a control sleeve 17 are separately movable on the actuating rod. The control sleeve 15 has a counterbore which accommodates a pressure spring 19 slid over the actuating rod 3, the spring extending between the bottom 21 of the counterbore and a central boss 23 on the profiled member 5. A snap ring 25 is locked in a groove on the rod 3 between the clamping sleeve 15 and control sleeve 17, the clamping sleeve 15 bearing against the ring in the initial position under pressure of the spring 19. At the lower end of the clamping sleeve 15 a central downwardly pointing cone 27 is formed by which an inward projection 29 of a clamping lever 31 can be urged outwards. In the initial position in accordance with FIG. 1 the clamping sleeve 15 ensures that the clamping levers 31 (around the stacking spindle a group of at least three such clamping levers is provided, only one of which is shown) are kept retracted because the outer wall of the clamping sleeve 15 bears against the clamping levers 31 above a clamping lever pivot 32.

The control sleeves 17 in the lower part of the stacking spindle actuates the supporting levers 33. In the initial position the control sleeve 17 is blocked against axial movement by a ball latching device 35. This ball-latching device includes a ball 37, which is captured but radially movable in a hole 39 of the control sleeve 17, an opening 41 in the outer tube 1 with a diameter smaller than the diameter of the ball 37, and a cone 43 on the actuating rod 3, which cone is movable with the rod in a widened axial bore 45 of the control sleeve extending above the radial hole 39. In a similar arrangement as the clamping levers 31, a group of three supporting levers 33 is uniformly spaced around the stacking spindle. The individual supporting levers 33 are pivotally held by a spring clip 47 arranged so that they can swing out with their upper ends 51 passing through slots 49 in the outer tube 1 in the initial position shown in FIG. 1, so that a stack of records 53 can be supported by the upper ends 51.

As shown in FIGS. 2 and 3, as the rod 3 is moved downward and unlatches the ball latching device 35, the control sleeve 17 abuts the snap ring 25 and is pulled downward also. The oblique faces 55 of the supporting levers 33 then butt against the lower ends 57 of the slots 49, so that the supporting levers 33 are then retracted.

The clamping levers 33 are pivovtably mounted in openings 61 of the outer tube 1 with projections 59. This clamping lever 31 is moreover provided with a short outward projection 63 at a location below the projection 59, which projection 63 can protrude through a slot 64 in the tube 1 to grip and hold a record from the inside. Furthermore at least one of the clamping levers has a top extension arm 65 above the pivot projection 59, which arm can engage a stop 67 on the member 5 for the end-stop function described below.

The operation of the stacking spindle may be explained as follows. In the initial position of FIG. 1 the actuating rod 3 is moved to its highest position by the changing device according to the invention. In this highest position the cone 43 urges the ball 37 into the opening 41 of the tube 1, so that the control sleeve for the supporting levers 33 is locked height to the tube. In this position the supporting levers 33 are swung out, and they can support a stack of records 53. In this position the clamping levers 31 are retracted in the outer tube by the clamping sleeve 15.

When the command disc of the changing device is started, in order to drop a new record onto the turntable, the actuating rod 3 is pulled downwards by the changing device. During this downward movement the cone 27 of the control sleeve 15 butts against the inward projection 29 of each individual clamping lever 31. The clamping levers are then pivoted about their projections 59, and from the inside the small projections 63 press against the wall of the hole of the next to the bottom record 69. This record is then blocked together with the stack 53 on top of it. The downward movement of the clamping sleeve 15 for the clamping levers 31 is now terminated.

The actuating rod 3 is pulled further downwards. The cone 43 then releases the ball 37. Next, the snap ring 25 engages the top of the control sleeve 17 for the supporting levers 33, and moves the control sleeve 17 downwards, the lowermost record 71 being lowered over some length together with the supporting levers 33. When the oblique faces 55 of the arms 33 engage with the edge 57 in the tube 1, the supporting levers 33 pivot inwards, and the record 71, as is shown in FIG. 3, can drop. After the record 71 has been dropped, the actuating rod 3 is moved up again, the supporting levers 33 swing out again, the cone 27 releases the clamping levers 31 and, raised by the snap ring 25, moves upwards together with the actuating rod 3. During the upward travel the cone 43 has again urged the ball 37 outwards, so that the control sleeve 17 is again blocked at the specified height.

When the last record 73 has dropped and the changing device again initiates the changing cycle, the outward movement of the clamping levers 31 is not impeded when the actuating rod 3 is lowered. As a result, they swing out further than in the case that a record is present. Owing to the double arm of the clamping lever 31 and because of a specific unbalance the extension arm 65 moves so far inwards that it engages the stop edge 67. Thus, the downward movement of the actuating rod 3 is blocked. Blocking of the downward movement is interpreted as an end-stop signal by the changing mechanism.

As appears from the description of the stacking spindle, the operation of said spindle is fully dependent on the changing device which moves actuating rod 3 upwards and downwards. No spring forces have to be overcome, because the actuating rod is not pretensioned in any actuating direction. Moreover, all the changing commands, including the end-stop command, are transmitted to the stacking spindle or derived from the stacking spindle by the actuating rod only. The forces required for actuation are very small owing to the absence of a spring pre-tension, and the changing device can thus be simplified accordingly.

The Mechanism of the Invention

FIGS. 5 to 7 show how the stacking spindle in accordance with FIGS. 1 to 4 is actuated and how the end-stop command is derived from it.

FIG. 5 is a partial cross-section and partial view of the changing mechanism. The stacking spindle is locked in the chassis against rotation in an L-shaped slot 103 of a socket 105 by the tube 1 and a pin 4, in a similar way as a bayonet mount. The pin 13 of the actuating rod 3 is also locked to push-pull rod 109 by means of a bayonet mount 107, which rod 109 constitutes an extension of the actuating rod. The push-pull rod 109 is guided in a sleeve 111, which is pressed into a mount 113 of the chassis 115. The turntable 117 is journalled on this mount 113 by means of a ball-bearing 119. Inside the push-pull rod 109 a push pin 121 is located, which projects further downwards from the push-pull rod when the stacking spindle is fitted than when the stacking spindle has been removed.

If no stacking spindle is fitted, the push pin 121 projects only slightly downwards from the push-pull rod 109, and a locking bracket 123, positioned to engage the actuating rod on the extenion pin 121, can assume the position represented by solid lines in FIG. 5. This locking bracket 123 includes a bar 125, which is pivotably journalled on a pulling lever 127 in the bearing 128. A hookshaped bracket 129 projects upwards from the bar 125, which bracket engages a stop edge 133 by means of a hook 131. This means that the locking bracket 129 only alloys a downward movement over the distance a at the location of the push-pull rod 109. As is to be described hereinafter, this constitutes an end-stop command for the changing device, However, if the push pin 121 extends further downwards when the stacking spindle is fitted, the locking bracket 123 assumes the dash-dotted position, and the hook 131 cannot engage the stop edge. This means that the pulling lever can pull the push-pull rod further downwards, which corresponds to a normal changing cycle. The bar 125 is continuously urged against the push pin by a leaf spring 135.

The pulling lever 127 is pivotable about a spindle 137, which is secured to the chassis 115. Its free end 138 engages with the stacking spindle or its extension. A roller lever 139 is in its turn pivotably journalled on the pulling lever by a spindle bearing 143. Furthermore, a push lever 141 is journalled on the chassis by means of the spindle bearing 145. As is shown in FIGS. 5 and 6, the roller lever 139 comprises a coupling hook 147, which passes through a slot 149 in the pulling lever 127 and which engages the underside 151 of the pulling lever 127 under the influence of the tensile action of springs 153, which are tensioned between a lug 155 of the pulling lever 127 and an indentation 157 of the roller lever 139.

A pull-out part or roller mounted on the roller lever 139 travels over a control track 161 of a command disc 163. During a normal changing cycle the force of the springs 153 is adjusted so that the pulling lever 127 will pivot in the counterclockwise direction as a result of movement of the pull-out roller 159 and the roller lever 139 in a first direction, downward. During this pivotal movement the pulling lever 127 can take along the push-pull rod 109, with which it engages at its lower end in a non-positive and articulated manner. For this purpose, the lower end of the push-pull rod passes through an opening 165 of the pulling lever 127 and extends underneath the underside 151 of the pulling lever 127 with laterally projecting tabs 167. Thus, the pivotal movements of the pulling lever 127 ensure that the push-pull rod 109 and consequently the actuating rod 3 can be moved up and down.

It is now assumed that a changing cycle is to be initiated by the command disc 163, which has been started, that the stacking spindle has been inserted, and a stack of records rests on the stacking spindle. The pull-out roller 159 then moves from the rest position shown in FIG. 5 along an ascending surface or hill 161' of the first control track 161 in accordance with the dash-dot position in FIG. 6. Thus, the pulling lever 127 pivots in the counterclockwise direction and moves the push-pull rod 109 and the actuating rod 3 downwards. As the stacking spindle has been inserted and the locking bracket 123 has thus pivoted from a position A into a position B, the locking bracket 123 moves past the stop edge 133. The travel then corresponds to the greater distance b in FIG. 6. The stacking spindle then performs the record changing cycle. When the command disc rotates further, the roller 159 rolls along a descending surface down the hill 161' on the height-control track 161. In a changing movement which is coordinated therewith a part or roller 169 of the push lever 141 simultaneously moves along an ascending surface or hill 171' of a second control track 171. As a result of this, the roller 169 together with an arm 172 of the two-armed push lever 141, in which arm said roller is journalled, is urged downwards, the other arm 173 of the lever 141 being pivoted upwards and urged against the underside 151 of the pulling lever 127. As a result of this, the pulling lever 127 is pivoted back in the clockwise direction, namely into the position represented by solid lines in FIG. 5. Simply stated, the roller lever 139 ensures that at the beginning of a changing cycle the pulling lever 127 is pivoted in the counterclockwise direction, the push-pull rod 109 and the actuating rod 3 being pulled downwards, and subsequently upon termination of the changing cycle the push lever 141 via its pressure roller 169 ensures that the pulling lever 127 is pivoted back in the clockwise direction and thus that the push-pull rod 109 and the actuating rod 3 are moved upwards. In order to simplify the drawing, the positions shown in FIGS. 5 and 6 of the height control tracks 161 and 171 as well as the positions of the rollers 159 and 169 moving on said tracks, do not exactly correspond to the positions of FIG. 7. These changes were necessary to simplify the drawing.

The fact that in the absence of a record on the stacking spindle the actuating rod 3 and with it the push-pull rod 109 can no longer be pulled out completely (the extension arm 65 has engaged the stop 67) is interpreted as the end-stop command by the changing device. If the roller 159 now moves up the ascending surface 161' of the height control track 161, the pulling lever 127 can no longer pivot far enough, because it is retained halfway. The changing device compensates for these counteracting forces, in that the roller lever 139 expands the springs 153 and pivots to follow the surface 161 without the pulling lever 127 being swung out completely. This position is represented by solid lines in FIG. 6 (the locking bracket 123 is again shown dash-dotted), where the coupling hook 147 in its position shown by solid lines is lifted substantially from the underside 151 of the pulling lever 127. Thus, the roller lever 139 constitutes a kind of overload protection, and allows movement of the pull-out part or roller 159 in the first direction, downward, even though full movement of the free end 138 of the lever 127 is blocked.

If no stacking spindle is fitted in the sleeve 111 and thus coupled to the push-pull rod 109, the locking bracket 123 assumes position A. The hook 131 then engages the stop edge 133. If upon termination of a playing cycle the control track 161 urges the pulling lever 127 to pivot in the counterclockwise direction, the hook 131 blocks the pulling lever, so that it cannot pivot fully (locking bracket 123 in position represented by solid lines in FIG. 6). In the absence of a record the roller lever 139 is again lifted off the pulling lever 127 with its coupling hook (dash-dot position of the roller lever 139 in FIG. 6). This slightly pivoted position of the pulling lever 127 (position represented by solid lines in FIG. 6) is an indication for the changing mechanism to return the pick-up arm. No matter whether a stacking spindle has been inserted into the changer, and there is no more record on the stacking spindle, or whether the changing spindle has been removed, the return of the pick-up arm is always initiated in both situations.

FIG. 7 is a bottom view of the changing device, as shown in FIGS. 5 and 6. The position of the command disc corresponds to the position in accordance with FIG. 5. As can be seen in FIG. 7, the U-shaped profiled pulling lever 127 pivots about the spindle 137 which is journalled on the chassis. A spindle 143 for the roller lever 139 is, in its turn, journalled on the pulling lever 127, the roller 159 scanning the surfaces of the track 161. Springs 153, shown as dot-dashed lines, provide a pre-tension force biasing the roller lever 139. A leaf spring 135 urges the bar 125 continually against the push rod 121. The push lever 141 is journalled on the chassis 115 by the spindle 145, the arm 173 of the push lever 141 bearing against the underside of the pulling lever 127 and deriving its movements from the control track 171 which the roller 169 engages.

What is claimed is

1. An actuating lever mechanism for a record changer having a changer command means, and a stacking spindle having a single actuating rod for record dropping functions, comprising
   a chassis,
   a pulling lever movably mounted to said chassis, having a lever free end,
   means for moving said stacking spindle actuating rod responsive to movement of said free end,
   first means for moving said free end in a first direction in response to scanning of a first track on a command means, and
   second means for moving said free end in a second direction opposite said first direction in response to scanning of a second track on the command means.

2. A mechanism as claimed in claim 1 wherein said pulling lever is pivoted to said chassis, and said second means comprises a push lever pivotally mounted to the chassis and having a part engaging said second track, said push lever being arranged so as to move said pulling lever in said free end second direction in response to scanning of an ascending surface of said second track.

3. A mechanism as claimed in claim 2 wherein said second track has a descending surface, said first track has a descending surface and an ascending surface corresponding to the respective ascending and descending surfaces of the second track, and said first means is arranged so as to scan said first track ascending surface and move the free end in the first direction while said push lever part in scanning the second track descending surface; and conversely said first track descending surface and second track ascending surface are scanned at the same time.

4. A mechanism as claimed in claim 2, wherein said first means includes a pull-out part engaging said first track, and means coupling said pull-out part to said pulling lever for allowing movement of said pull-out part in a direction corresponding to movement of the free end in the first direction while full movement of the free end is blocked.

5. A mechanism as claimed in claim 4, wherein said coupling means comprises a roller lever pivotally mounted to said pulling lever and biasing means connecting said roller lever to said pulling lever for resiliently resisting relative movement therebetween upon movement of said pull-out part in said corresponding direction.

6. A mechanism as claimed in claim 5, wherein said roller lever and pulling lever are pivoted about parallel axes, and said biasing means comprises a tension spring biasing said roller lever in a direction which urges the pull-out part toward a surface of the first track.

7. A mechanism as claimed in claim 1, further comprising a locking bracket pivotally mounted to the pulling lever, so arranged that, in a first position relative to said pulling lever a portion of said bracket engages a stop edge of the chassis to limit movement of said free end in said first direction.

8. A mechanism as claimed in claim 7, comprising means for pivoting said locking bracket from said first position responsive to insertion of a removable stacking spindle in the changer, whereby said free end is movable a greater distance in said first direction in the presence of a stacking spindle than in its absence.

* * * * *